US012585702B1

(12) United States Patent
Lipman et al.

(10) Patent No.: US 12,585,702 B1
(45) Date of Patent: Mar. 24, 2026

(54) METHODS, SYSTEMS, AND MEDIA FOR STORING UPDATES TO GRAPH DATABASES

(71) Applicant: Falklor DB, Tel Aviv-Jaffa (IL)

(72) Inventors: Roi Lipman, Ramat Gan (IL); Guy Korland, Petah Tikva (IL); Avraham Avni, Netivot (IL)

(73) Assignee: Falklor DB, Tel Aviv-Jaffa (IL)

( * ) Notice: Subject to any disclaimer, the term of this patent is extended or adjusted under 35 U.S.C. 154(b) by 0 days.

(21) Appl. No.: 17/864,300

(22) Filed: Jul. 13, 2022

(51) Int. Cl.
*G06F 16/901* (2019.01)
*G06F 16/23* (2019.01)

(52) U.S. Cl.
CPC ...... *G06F 16/9024* (2019.01); *G06F 16/2358* (2019.01)

(58) Field of Classification Search
CPC .......................... G06F 16/9024; G06F 16/2358
USPC .......................................................... 707/798
See application file for complete search history.

(56) References Cited

U.S. PATENT DOCUMENTS

| | | | | |
|---|---|---|---|---|
| 11,228,505 B1 * | 1/2022 | Wang | ........................ | G06N 5/01 |
| 11,822,899 B2 * | 11/2023 | Bittner | ...................... | G06F 7/483 |
| 2003/0051026 A1 * | 3/2003 | Carter | ................. | H04L 63/0263 |
| | | | | 709/224 |
| 2003/0159106 A1 * | 8/2003 | Aono | .................. | G06F 16/3347 |
| | | | | 707/E17.058 |
| 2004/0260546 A1 * | 12/2004 | Seo | .......................... | G10L 15/20 |
| | | | | 704/E15.039 |

| | | | | |
|---|---|---|---|---|
| 2011/0307685 A1 * | 12/2011 | Song | ......................... | G06F 17/10 |
| | | | | 712/16 |
| 2014/0244657 A1 * | 8/2014 | Mizell | ................. | G06F 16/2228 |
| | | | | 707/743 |
| 2015/0269280 A1 * | 9/2015 | Astier | ................. | G06F 16/9024 |
| | | | | 707/798 |
| 2015/0379054 A1 * | 12/2015 | Kernert | ................... | G06F 17/16 |
| | | | | 707/625 |
| 2016/0042019 A1 * | 2/2016 | Oks | ...................... | G06F 16/2272 |
| | | | | 707/602 |
| 2017/0061279 A1 * | 3/2017 | Yang | ...................... | G06N 3/084 |

(Continued)

FOREIGN PATENT DOCUMENTS

| | | | | |
|---|---|---|---|---|
| CN | 112311571 A | * | 2/2021 | ............. H04L 41/12 |

OTHER PUBLICATIONS

Atre et al., Matrix "Bit" loaded: A Scalable Lightweight Join Query Processor for RDF Data, International World Wide Web Conference Committee (IW3C2), 2010, all pages. (Year: 2010).*

(Continued)

*Primary Examiner* — Mark E Hershley
*Assistant Examiner* — Antonio J Caiado

(57) ABSTRACT

Mechanisms for storing updates to a graph database are provided, the mechanisms including: storing the graph database in at least a first matrix; receiving a first update to the graph database; storing the first update to the graph database in at least a second matrix; and updating the at least a first matrix using a combination of at least the at least the first matrix and the at least the second matrix using a hardware processor. In some of these mechanisms, the at least the first matrix is stored in a first compressed sparse format. In some of these mechanisms, the first update to the graph database includes a new entry to the graph database. In some of these mechanisms, the first update to the graph database includes a change to an entry in the graph database.

24 Claims, 4 Drawing Sheets

(56) References Cited

U.S. PATENT DOCUMENTS

| | | | |
|---|---|---|---|
| 2018/0189239 A1* | 7/2018 | Nurvitadhi | G06F 9/30036 |
| 2018/0246986 A1* | 8/2018 | Haubenschild | G06F 16/9024 |
| 2019/0122317 A1* | 4/2019 | Hunn | H04L 9/0637 |
| 2019/0147015 A1* | 5/2019 | Zhang | G06F 9/3001 |
| | | | 708/607 |
| 2019/0370254 A1* | 12/2019 | Maxwell | G06F 16/221 |
| 2020/0110761 A1* | 4/2020 | Cooper | G06F 16/28 |
| 2020/0201910 A1* | 6/2020 | Gavaudan | G06Q 20/32 |
| 2020/0293105 A1* | 9/2020 | Ambardekar | G06F 1/3275 |
| 2020/0311183 A1* | 10/2020 | Simpson | G06F 17/16 |
| 2020/0326938 A1* | 10/2020 | Liu | G06F 9/3887 |
| 2021/0021371 A1* | 1/2021 | Yanovsky | G06F 3/067 |
| 2021/0073287 A1* | 3/2021 | Hunter | H04L 63/123 |
| 2021/0103574 A1* | 4/2021 | Belezko | G06N 20/00 |
| 2021/0133612 A1* | 5/2021 | Sinha | G06F 30/20 |
| 2021/0182077 A1* | 6/2021 | Chen | G06F 7/5443 |
| 2021/0288976 A1* | 9/2021 | Huang | G06N 3/045 |
| 2021/0303574 A1* | 9/2021 | Brown | G06F 17/16 |
| 2022/0076095 A1* | 3/2022 | Qin | G06N 3/04 |
| 2022/0121652 A1* | 4/2022 | Forghani | G06F 16/27 |
| 2022/0414077 A1* | 12/2022 | Yokoyama | G06F 16/285 |
| 2023/0185810 A1* | 6/2023 | Dekoker | G06N 5/046 |
| | | | 707/773 |

OTHER PUBLICATIONS

Timothy A. Davis, Algorithm 1000: SuiteSparse: GraphBLAS: Graph Algorithms in the Language of Sparse Linear Algebra, Texas A &M University, USA, 2019, all pages. (Year: 2019).*

* cited by examiner

METHODS, SYSTEMS, AND MEDIA FOR STORING UPDATES TO GRAPH DATABASES

BACKGROUND

A graph database is a database designed specifically for efficiently storing and quickly querying graph data. A graph, in its simplest form, can be a set of nodes and edges.

In some graphs, an edge e denotes a directed connection between two nodes: the edge source node x; and the edge destination node y. In other graphs, edges can be undirected.

Usually graph databases allow both labels and attributes to be associated with nodes and edges. This extension (also known as the "property graph model") enables users to define their data as graphs.

For example, a social network can be represented by a property graph.

In a graph of a social network, there can be two types of nodes: users; and posts. In some implementations of such a graph, each user can have a set of attributes: name; email address; and date of birth (for example). And, each post can have two attributes: creation date; and content (for example).

In addition, in a graph of a social network, there can be two (for example) types of relations: author; and follows (for example), where users are connected to posts they've created with author type edges and users are connected to other users they're interested in with follows type edges.

Graph databases are typically expected to support all creating, reading, updating, and deleting (CRUD) operations on graph entities (i.e., nodes and edges), as well as fetching sub-graphs.

In some instance, graphs can be implemented using an adjacency matrix representation, which uses a matrix to capture graph topology. For example, for a given directed graph with N nodes, one can use an N-by-N Boolean matrix to describe the graph. Assuming each node is associated with a unique identifier (ID) i ranging from 0 to N−1, a node i can be mapped to the matrix $i^{th}$ row and $i^{th}$ column. For a directed edge connecting a node i to a node j, the matrix can have its [ij] entry active (e.g., set to 1). When there is no an edge connecting a node i to a node j, the [ij] entry can be inactive (e.g., set to 0).

Consider a graph with three nodes, No, $N_1$, and $N_2$, and four edges, $N_0N_2$, $N_1N_0$, $N_2N_0$, and $N_2N_1$. This graph can be described with the following matrix:

$$A = \begin{bmatrix} 0 & 0 & 1 \\ 1 & 0 & 0 \\ 1 & 1 & 0 \end{bmatrix}$$

In this matrix, the top left is position 0,0, and the bottom right is position 2,2. The "1" in the top-right position represents edge $N_0N_2$. The "1" in the middle row represents edge $N_1N_0$. The "1" in the bottom-left position represents edge $N_2N_0$. And, the "1" in the middle of the bottom row represents edge $N_2N_1$.

Graph traversal can be performed via vector matrix or matrix-matrix multiplication.

To illustrate graph traversal via matrix-matrix multiplication, consider the previous graph A. Note that node $N_0$ is two hops away from node $N_1$ via the path: $N_0 \rightarrow N_2 \rightarrow N_1$. In addition, there is a cycle in the graph connecting No back to itself: $N_0 \rightarrow N_2 \rightarrow N_0$.

Two-hop connections can be identified by multiplying A by itself as follows:

$$A * A = \begin{bmatrix} 1 & 1 & 0 \\ 0 & 0 & 1 \\ 1 & 0 & 1 \end{bmatrix}$$

As can be seen, the "1" in the middle of the top row indicates that node $N_0$ is exactly two hops away from node $N_1$. And the "1" in the left of the top row indicates that node $N_0$ is exactly two hops away from itself.

Some graph matrices can be sparse—meaning that a relatively low (e.g., 5% or any other suitable value) number of entries in the matrices are set.

One of the common formats used to represent a sparse matrix is the Compressed Sparse Row (CSR) format. This format uses a hierarchy of three arrays to represent a sparse matrix: a row indices array; a column indices array; and a values array.

The row indices array, which can be referred to as Ap, has a length of N+1, where N is the number of rows in the matrix. The entries Ap[i=0] to Ap[i=N−1] contain offsets to entries in the column indices array and to entries in the values array for the first active columns of each row i, where i is a value from 0 to N−1. The entry Ap[N] indicates the number of non-zero (i.e., set) entries in the matrix. As such one can easily find out how many active entries there are for a given row i by subtracting Ap[i] from Ap[i+1].

The column indices array, which can be referred to as Aj, has a length equal to the number of active entries in the matrix and contains indices to the active columns in each row of the matrix. Aj[Ap[i], . . . , Ap[i+1]−1] holds one or more indices to the non-empty columns in the ith row of the matrix.

The values array, which can be referred to as Ax, has a length equal to the number of active entries in the matrix and contains the non-zero (i.e., set) values of the matrix. Ax[Ap[i] . . . Ap[i+1]−1] holds the values of the present entries in the ith row of the matrix.

Thus, the following matrix A can be represented in CSR format as:

$$A = \begin{bmatrix} . & . & 1 \\ 6 & . & . \\ 4 & 9 & . \end{bmatrix}$$

$$Ap = [0, 1, 2, 4]$$

$$Aj = [2, 0, 0, 1]$$

$$Ax = [1, 6, 4, 9]$$

Similar to CSR format, the Compressed Sparse Column (CSC) format can also be used to represent a sparse matrix. In the CSC format, the matrix data is stored by columns instead of rows.

The column indices array, which can be referred to as Ap, has a length of N+1, where N is the number of columns in the matrix. The entries Ap[i=0] to Ap[i=N−1] contain offsets to entries in the row indices array and to entries in the values array for the first active rows of each column i, where i is a value from 0 to N−1. The entry Ap[N] indicates the number of non-zero (i.e., set) entries in the matrix. As such one can easily find out how many active entries there are for a given column i by subtracting Ap[i] from Ap[i+1].

The row indices array, which can be referred to as Aj, has a length equal to the number of active entries in the matrix and contains indices to the active rows in each column of the matrix. Aj[Ap[i], . . . , Ap[i+1]−1] holds one or more indices to the non-empty rows in the ith column of the matrix.

The values array, which can be referred to as Ax, has a length equal to the number of active entries in the matrix and contains the non-zero (i.e., set) values of the matrix. Ax[Ap[i] . . . Ap[i+1]−1] holds the values of the present entries in the ith column of the matrix.

The following matrix can be represented in CSC format as:

$$A = \begin{bmatrix} . & . & 1 \\ 6 & . & . \\ 4 & 9 & . \end{bmatrix}$$

$$Ap = [0, 2, 3, 4]$$

$$Aj = [1, 2, 2, 0]$$

$$Ax = [6, 4, 9, 1]$$

In some instances, a hyper-sparse matrix representation can be used to describe CSR and CSC matrices. This representation uses four arrays: Ah, Ap, Aj and Ax, where, when used for CSR, Ah holds an entry for every non-zero row indicating the index number of that row in the matrix, Ap is no longer of size N but has the same size as Ah plus one, and Aj and Ax have the same definition as in CSR.

Consider the following matrix as an example:

$$A = \begin{bmatrix} . & . & 1 \\ . & . & . \\ 5 & 9 & . \end{bmatrix}$$

As can be seen, row 1 is completely empty.

The hyper-sparse representation of A is as follows:

Ah=[0,2]

Ap=[0,1,3]

Aj=[2,0,1]

Ax=[1,5,9]

The entries in Ap contain offsets to entries in the column indices array Aj and to entries in the values array Ax for the first active columns of each non-zero row. The last entry in Ap indicates the number of non-zero (i.e., set) entries in the matrix.

The Hyper-Sparse representation is usually utilized when the ratio between the number of non-zero rows k and N (the total number of rows in the matrix) is lower than a given value (e.g., 0.5% or any other suitable value). In such cases, representing a matrix using the Hyper-Sparse representation saves memory and improves matrix modification (set/unset) time as less array entries need to be moved and updated.

Setting a new entry in a CSR matrix requires the following operations:

1. increase both Aj and Ax arrays' size by one;

2. locate the insertion index in both Aj and Ax;

3. shift entries to the right in both Aj and Ax to make room for the new entry;

4. set new entry column index in Aj and new entry value in Ax; and 5. update Ap entries starting from new entry row index up to the last entry in Ap.

For example, consider setting A[1,1]=1 as shown below.

$$A = \begin{bmatrix} . & . & 1 \\ 1 & 1 & . \\ 1 & 1 & . \end{bmatrix}$$

First, the sizes of Aj and Ax are both increased from four to five. Second, the new entry will be inserted at index 2 since it will be the third non-zero value in Ax (i.e., the first non-zero value is at index 0, the second non-zero value is at index 1, and the third non-zero value is at index 2). Third, all entries Aj[2 . . . NVALS−1] and Ax[2 . . . NVALS−1] (where NVALS is the number of non-zero values in the matrix prior to the present addition) are shifted to the right (i.e., the value previously at index NVALS−1 is moved to index NVALS, the value previously at NVALS−2 is moved to index NVALS−1, the value previously at NVALS−3 is moved to index NVALS−2, and so on all the way down to the value previously at index 2 being moved to index 3) making room for the new entry. Fourth, the new column index and the new value are set: Aj[2]=1 and Ax[2]=1. Fifth, entries Ap[2 . . . N] are updated by increasing each entry by 1, where N is the number of rows in the matrix. This will result in the arrays appearing as follows:

Ap=[0,1,3,5]

Aj=[2,0,1,0,1]

Ax=[1,1,1,1,1]

Deleting an entry from a CSR matrix requires the following operations:

1. locate the to-be-deleted entry i,j index (idx) in both Aj and Ax;

2. shift entries idx+1 . . . nvals−1 to the left in both Aj and Ax to remove the to-be-deleted entry;

3. decrease the sizes of both Aj and Ax by one; and 4. update Ap, reduce Ap[i+1] through Ap[N] by one.

For example, consider removing A[1,1] so that matrix A will appear as follows:

$$A = \begin{bmatrix} . & . & 1 \\ 1 & . & . \\ 1 & 1 & . \end{bmatrix}$$

First, the to-be-deleted entry is located as being at index 2 (idx=2) since it is the third non-zero value in Ax (i.e., the first non-zero value is at index 0, the second non-zero value is at index 1, and the third non-zero value is at index 2). Second, all entries Aj[idx+1 . . . NVALS−1] and Ax[idx+1 . . . NVALS−1] (where NVALS is the number of non-zero values in the matrix prior to the present deletion) are shifted to the left (i.e., the value previously at index 3 is moved to index 2, the value previously at index 4 is moved to index 3, the value previously at index 5 is moved to index 4, and so on all the way up to the value previously at index NVALS−1 being moved to index NVALS−2) thus removing the to-be-deleted entry. Third, the sizes of Aj and Ax are both decreased from five to four. Fourth, entries Ap[2 . . . N] are updated by decreasing each entry by one, where N is the number of rows in the matrix. This will result in the arrays appearing as follows:

Ap=[0,1,2,4]

Aj=[2,0,0,1]

Ax=[1,1,1,1]

A resize operation can increase or decrease a matrix's dimensions by adding or removing, respectively, rows or columns. New rows are added at the bottom of the matrix, rows are removed from the bottom of the matrix, new columns are added at the right of the matrix, and columns are removed from the right of the matrix, in some embodiments. Adding a new row appends a new cell to the Ap array. The newly added entry (Ap[N+2]) contains the same value as Ap[N+1] before the resizing. Removing a row triggers a resize of the Ap array in addition to deletions of and reallocation of both the Aj and Ax arrays discarding active columns and values of the deleted row.

Adding new columns does not affect any of the arrays as the number of rows N and the number of entries NVALS does not change. Removing columns can be treated as multiple delete operations—one for each active entry in a column to be removed.

The CSR format requires N*8+NVALS*8+NVALS bytes to represent a boolean matrix with N rows and NVALS entries. 8 bytes are required for each numeric index entry in Ap and Aj The dense matrix format simply tracks every matrix entry, active or inactive, usually a single array of size N*M entries is used, N being the number of rows an M number of columns.

To compare the two formats, consider a 1 million by 1 million Boolean matrix with 1 million active entries. The dense format requires (1M*1M) bytes=1000 GB of storage space, while the CSR or the CSC format will require only (1M*8+1M*8+1M) bytes=17 MB of storage space.

For performance reasons, a database system will prefer keeping all of its data in a fast access storage, primarily RAM. As this storage is limited in size and costly, such a database system will favor a sparse format over the dense one. Fortunately, most naturally formed graphs (e.g., social networks) are sparse.

Most graph database systems will be dealing with graphs that change over time: new nodes will be added; existing nodes will be discarded; and connections will be formed and removed as time progresses.

The addition of a node to a graph can translate into a matrix resize operation. Removal of a node can trigger multiple matrix entry deletions, one for every incoming or outgoing node's edge. Addition of an edge can perform a single matrix element set operation. Lastly, a removal of an edge can be done by a single matrix element delete operation.

The amount of time that is required to perform the operations described above varies based on the size of a matrix on which the operations are being performed (e.g., larger matrices and matrices with more active entries require more time than smaller matrices and matrices with fewer active entries), which is an undesirable property for a database system. The larger and denser a matrix is, the longer it takes to perform the above-described operations. This has drastic implications for a database system, as CRUD operations need to run as fast as possible in addition to having a constant and predictable runtime which is not affected by the amount of data stored in the database system.

Accordingly, it is desirable to provide new mechanisms for storing updates to graph databases.

SUMMARY

In accordance with embodiment some embodiments, methods, systems, and media for storing updates to graph databases are provided.

In some embodiments, methods for storing updates to a graph database are provided, the methods comprising: storing the graph database in at least a first matrix; receiving a first update to the graph database; storing the first update to the graph database in at least a second matrix; and updating the at least the first matrix using a combination of at least the at least the first matrix and the at least the second matrix using a hardware processor.

In some of these embodiments, the at least the first matrix is stored in a first compressed sparse format.

In some of these embodiments, the first update to the graph database includes a new entry to the graph database.

In some of these embodiments, the first update to the graph database includes a change to an entry in the graph database.

In some of these embodiments, the first update to the graph database includes a deletion of an entry from the graph database.

In some of these embodiments, the methods further comprise: receiving a second update to the graph database; and storing the second update to the graph database in at least a third matrix, wherein the updating the at least the first matrix comprises using a combination of at least the at least the first matrix, the at least the second matrix, and the at least the third matrix.

In some of these embodiments: the at least the second matrix is stored in a second compressed sparse format; and the at least the third matrix is stored in a third compressed sparse format.

In some of these embodiments, the second compressed sparse format is a hyper-sparse format.

In some of these embodiments, the third compressed sparse format is a Boolean hyper-sparse format.

In some of these embodiments: the first update includes one of a new entry to the graph database and a change to the graph database; and the second update includes a deletion from the graph database.

In some embodiments, systems for storing updates to a graph database are provided, the systems comprising: memory; and a hardware processor couple to the memory and configured to: store the graph database in at least a first matrix; receive a first update to the graph database; store the first update to the graph database in at least a second matrix; and update the at least the first matrix using a combination of at least the at least the first matrix and the at least the second matrix.

In some of these embodiments, the at least the first matrix is stored in a first compressed sparse format.

In some of these embodiments, the first update to the graph database includes a new entry to the graph database.

In some of these embodiments, the first update to the graph database includes a change to an entry in the graph database.

In some of these embodiments, the first update to the graph database includes a deletion of an entry from the graph database.

In some of these embodiments: the hardware processor is further configured to: receive a second update to the graph database; and storing the second update to the graph database in at least a third matrix, wherein the updating the at least the first matrix comprises using a combination of at least the at least the first matrix, the at least the second matrix, and the at least the third matrix.

In some of these embodiments: the at least the second matrix is stored in a second compressed sparse format; and the at least the third matrix is stored in a third compressed sparse format.

In some of these embodiments, the second compressed sparse format is a hyper-sparse format.

In some of these embodiments, the third compressed sparse format is a Boolean hyper-sparse format.

In some of these embodiments: the first update includes one of a new entry to the graph database and a change to the graph database; and the second update includes a deletion from the graph database.

In some embodiments, non-transitory computer-readable media containing computer executable instructions that, when executed by a processor, cause the processor to perform a method for storing updates to a graph database are provided, the method comprising: storing the graph database in at least a first matrix; receiving a first update to the graph database; storing the first update to the graph database in at least a second matrix; and updating the at least the first matrix using a combination of at least the at least the first matrix and the at least the second matrix.

In some of these embodiments, the at least the first matrix is stored in a first compressed sparse format.

In some of these embodiments, the first update to the graph database includes a new entry to the graph database.

In some of these embodiments, the first update to the graph database includes a change to an entry in the graph database.

In some of these embodiments, the first update to the graph database includes a deletion of an entry from the graph database.

In some of these embodiments, the method further comprises: receiving a second update to the graph database; and storing the second update to the graph database in at least a third matrix, wherein the updating the at least the first matrix comprises using a combination of at least the at least the first matrix, the at least the second matrix, and the at least the third matrix.

In some of these embodiments: the at least the second matrix is stored in a second compressed sparse format; and the at least the third matrix is stored in a third compressed sparse format.

In some of these embodiments, the second compressed sparse format is a hyper-sparse format.

In some of these embodiments, the third compressed sparse format is a Boolean hyper-sparse format.

In some of these embodiments: the first update includes one of a new entry to the graph database and a change to the graph database; and the second update includes a deletion from the graph database.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
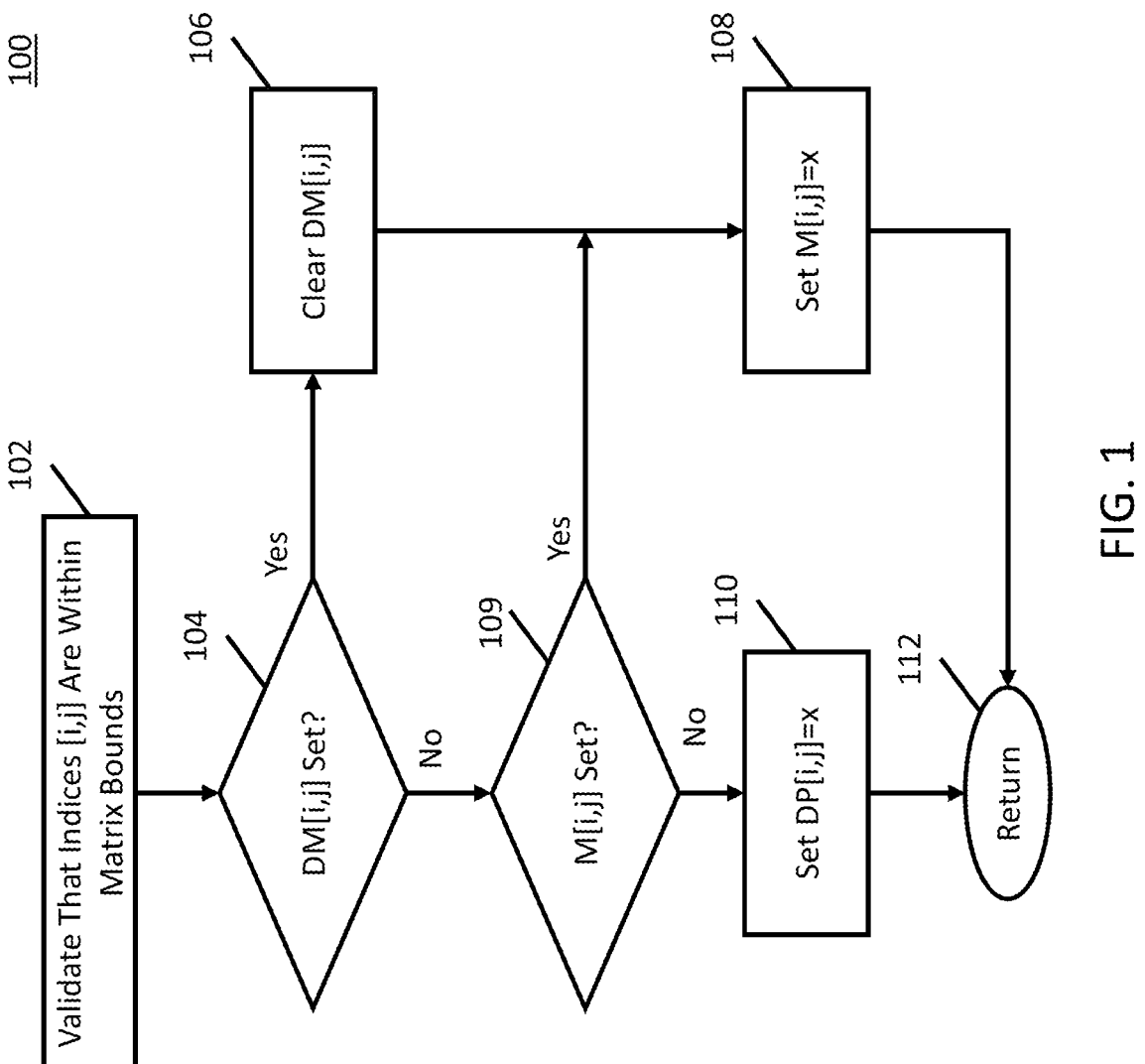
FIG. 1 shows an example of a process for performing a set element operation in accordance with some embodiments of the disclosed subject matter.

In accordance with some embodiments, mechanisms for performing operations on graph databases are provided. For purposes identification, these mechanisms can be referred to herein as "delta representations," however this term should not be considered to limit the definition of the mechanisms.

In some embodiments, a graph database, which could be represented by an N×K matrix A, can be represented by a set of three N×K matrices: M; DP; and DM. In some embodiments, M can be represented using a CSR format, a CSC format, or any other suitable format. In some embodiments, DP (which can be referred to as "delta plus") can be represented using a CSR Hyper-Sparse format, a CSC Hyper-Sparse format, or any other suitable format. In some embodiments, DM (which can be referred to as "delta minus") can be represented using a Boolean CSR Hyper-Sparse format, a Boolean CSC Hyper-Sparse format, or any other suitable format.

In some embodiments, M holds a base version of the graph database. In some embodiments, M accurately represents the graph database when first formed and immediately after matrices DP and DM are flushed to M (as described below). In some embodiments, DP captures entries recently indicated to be set in M, and DM captures entries recently indicated to be removed from M. The relationship between A, M, DP, and DM, in some embodiments, can be represented with equations as follows:

$$M \cap DP = \varnothing$$

$$M \cap DM = DM$$

$$DP \cap DM = \varnothing$$

$$A = (M - DM) + DP$$

In some embodiments, during database operation, newly added entries are entered in DP, and newly removed entries from M are entered in DM. A recent modification is captured in either DM or DP, but not both, in some embodiments. The matrix A can be constructed by adding newly set entries into M and by removing recently deleted entries from it, in some embodiments.

In some embodiments, a user configurable threshold T can be used to control how many changes the delta matrices DP and DM can accumulate before flushing DM and DP into M and clearing DM and DP. For example, if the number of entries in DP plus the number of entries in DM is greater than (or equal to, or greater than or equal to) T, DP and DM are flushed into M and DP and DM are then cleared (e.g., all entries in DP and DM removed).

For example, consider adding a new entry at position [0,2] and removing an existing entry from position [1,2] to the matrix A as shown below:

$$A = \begin{bmatrix} . & . & . \\ 1 & . & 1 \\ 1 & 1 & . \end{bmatrix}$$

As shown below, the matrix A is copied into M. And then position [0,2] is set in DP and position [1,2] is set in DM, both as shown below.

$$\begin{bmatrix} \cdot & \cdot & 1 \\ 1 & \cdot & \cdot \\ 1 & 1 & \cdot \end{bmatrix}_A = \begin{bmatrix} \cdot & \cdot & \cdot \\ 1 & \cdot & 1 \\ 1 & 1 & \cdot \end{bmatrix}_M + \begin{bmatrix} \cdot & \cdot & 1 \\ \cdot & \cdot & \cdot \\ \cdot & \cdot & \cdot \end{bmatrix}_{DP} - \begin{bmatrix} \cdot & \cdot & \cdot \\ \cdot & \cdot & 1 \\ \cdot & \cdot & \cdot \end{bmatrix}_{DM}$$

Below are examples of matrix operations that can be used by graph databases expressed in delta matrix notation, in accordance with some embodiments.

Set Element

In some embodiments, a set element operation can be performed. Any suitable parameters can be used to control this operation in some embodiments.

For example, in some embodiments, the parameters can include an identifier of a matrix represented by M, DP, and DM. More particularly, for example, in the example above, parameters can include a matrix A represented by M, DP, and DM in some embodiments.

As another example, in some embodiments, the parameters can include indices to the matrix represented by M, DP, and DM. More particularly, for example, the parameters can include two indices i and j (or any other suitable variables) in some embodiments.

As yet another example, in some embodiments, the parameters can include a value to be set in the matrix represented by M, DP, and DM. More particularly, for example, the parameters can include a value x (or any other suitable variable) (e.g., 1) to be placed in the matrix (represented by M, DP, and DM) when set in some embodiments.

While performing the set element operation, as shown in example process 100 of FIG. 1, at 102, the process can first validate that the indices (e.g., i and j) are within matrix bounds in some embodiments. This validation can be performed in any suitable manner such as by comparing i and j to defined limits for the matrix in some embodiments.

Next, at 104, the process can determine if DM[i,j] is set. This determination can be made in any suitable manner in some embodiments.

If it is determined at 104 that DM[i,j] is set, the process can then clear DM[i,j] at 106 and can set M[i,j] equal to x at 108 in some embodiments. Clearing DM[i,j] and setting M[i,j] equal to x can be performed in any suitable manner in some embodiments.

Otherwise, if DM[i,j] is determined at 104 to not be set, the process can then determine at 109 whether M[i,j] is set, in some embodiments. If so, the process can set M[i,j] equal to x at 108 in some embodiments. Setting M[i,j] equal to x can be performed in any suitable manner in some embodiments. Otherwise, if M[i,j] is not set, the process can set DP[i,j] equal to x at 110 in some embodiments. Setting DP[i,j] equal to x can be performed in any suitable manner in some embodiments.

After setting M[i,j] at 108 or DP[i,j] at 110, process 100 can return to the calling process at 112 in some embodiments.

Remove Element

In some embodiments, a remove element operation can be performed. Any suitable parameters can be used to control the operation in some embodiments.

For example, in some embodiments, the parameters can include an identifier of a matrix represented by M, DP, and DM. More particularly, for example, the parameters can include a matrix A represented by M, DP, and DM in some embodiments.

As another example, in some embodiments, the parameters can include indices to the matrix represented by M, DP, and DM. More particularly, for example, the parameters can include two indices i and j (or any other suitable variables) in some embodiments.

Figure 2:
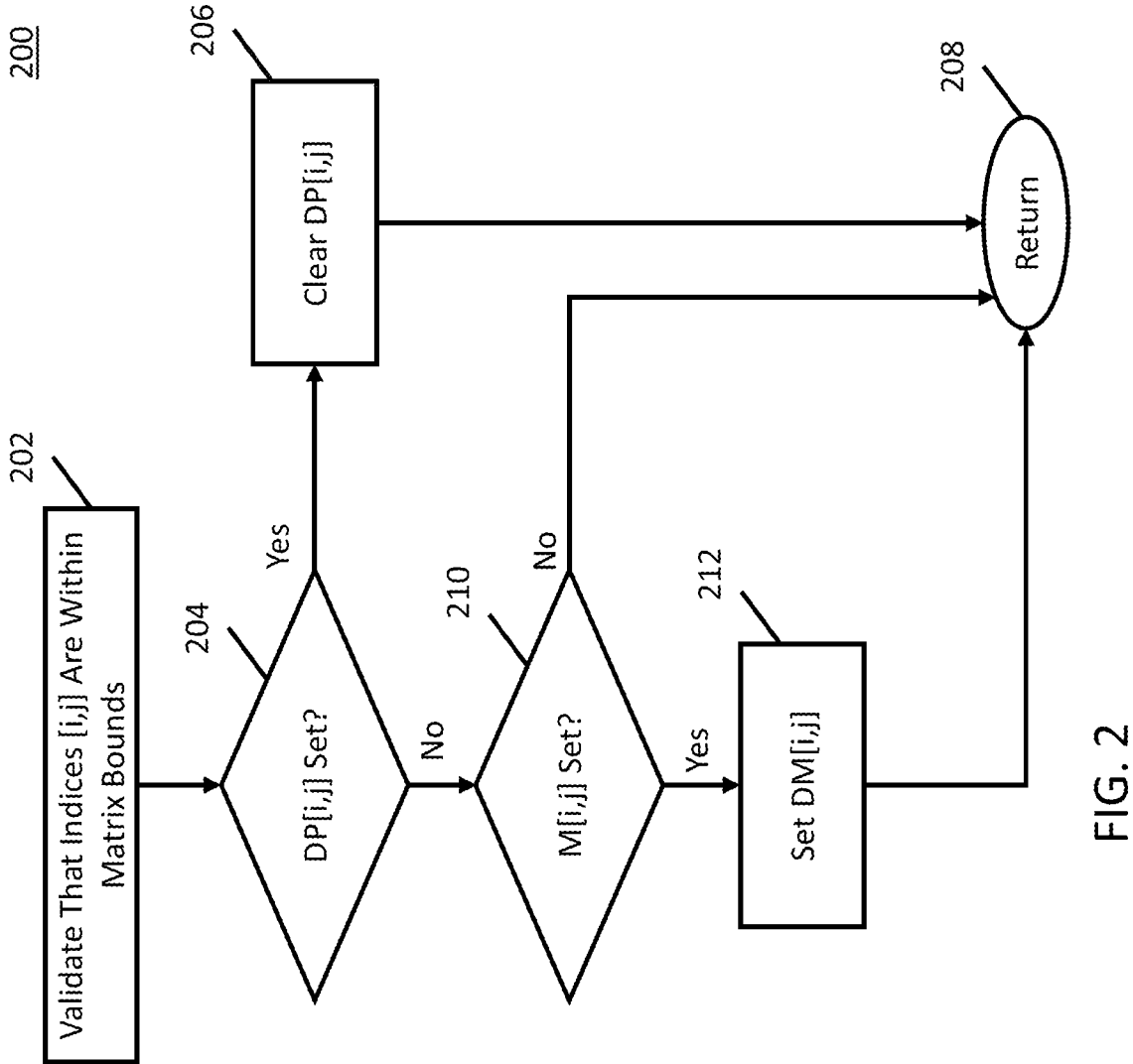
FIG. 2 shows an example of a process for performing a remove element operation in accordance with some embodiments of the disclosed subject matter.

While performing the remove element operation, as shown in example process 200 of FIG. 2, at 202, the process can first validate that the indices (e.g., i and j) are within matrix bounds in some embodiments. This validation can be performed in any suitable manner such as by comparing i and j to defined limits for the matrix in some embodiments.

Next, at 204, the process can determine if DP[i,j] is set. This determination can be made in any suitable manner in some embodiments.

If it is determined at 204 that DP[i,j] is set, the process can then clear DP[i,j] at 206 and process 200 can return to the calling process at 208 in some embodiments. Clearing DP[i,j] can be performed in any suitable manner in some embodiments.

Otherwise, if it is determined at 204 that DP[i,j] is not set, process 200 can determine if M[i,j] is set at 210. This determination can be made in any suitable manner in some embodiments.

If it is determined at 210 that M[i,j] is set, then process 200 can set DM[i,j] at 212 and return at 208. Setting DM[i,j] can be performed in any suitable manner in some embodiments.

Otherwise, if it is determined at 210 that M[i,j] is not set, then process 200 can return to the calling process at 208 in some embodiments.

Matrix Addition

In some embodiments, a matrix addition operation can be performed. Any suitable parameters can be used in some embodiments.

For example, in some embodiments, the parameters can include identifiers of two matrices each represented by their own M, DP, and DM. More particularly, for example, parameters can include a matrix A represented by M, DP, and DM and a matrix B represented by M, DP, and DM, in some embodiments.

For the operation of C=A+B, C can be calculated in some embodiments as follows:

$$C = A_M \!<\!\sim\! A_{DM}\!> + A_{DP} + B_M \!<\!\sim\! B_{DM}\!> + B_{DP}$$

wherein:

$A_M$ is the M matrix of matrix A;

$A_{DP}$ is the DP matrix of matrix A;

$A_{DM}$ is the DM matrix of matrix A;

$B_M$ is the M matrix of matrix B;

$B_{DP}$ is the DP matrix of matrix B;

$B_{DM}$ is the DM matrix of matrix B;

The $<\ >$ specifies a masking operation. The actual mask (a matrix) is specified within the angle brackets (i.e., $<\ >$). When a mask M is applied to a matrix A, only the set entries of A that are also set in the mask remain set in the result, and all other entries in the result are unset; and The $\sim$ tilde character stands for complement. When a mask M is complemented, the set entries are treated as unset and the unset entries are treated as set in the mask.

For example, given:

$$M = \begin{bmatrix} \cdot & 1 & 1 \\ 1 & \cdot & 1 \\ 1 & 1 & \cdot \end{bmatrix}$$

-continued $$A = \begin{bmatrix} 1 & 1 & 1 \\ 1 & . & 1 \\ 1 & 1 & 1 \end{bmatrix}$$

the following results:

$$\sim M = \begin{bmatrix} 1 & . & . \\ . & 1 & . \\ . & . & 1 \end{bmatrix}$$

$$A < \sim M >= \begin{bmatrix} 1 & . & . \\ . & . & . \\ . & . & 1 \end{bmatrix}$$

Matrix Multiplication

In some embodiments, a matrix multiplication operation can be performed. Any suitable parameters can be used in some embodiments.

For example, in some embodiments, the parameters can include identifiers of two matrices each represented by their own M, DP, and DM. More particularly, for example, parameters can include a matrix A represented by M, DP, and DM and a matrix B represented by M, DP, and DM, in some embodiments.

For the operation of C=A*B, C can be calculated in some embodiments as follows:

$$C=(A_M<\sim A_{DM}>+A_{DP})*(B_M<\sim B_{DM}>+B_{DP})$$

wherein the definitions provided above for matrix addition apply here as well.

Matrix Synchronization

In some embodiments, once enough changes in DP and DM have accumulated (i.e., when the number of entries in DP plus the number of entries in DM is greater than a threshold value T), it may be desirable to flush DM and DP into M. This can be referred to herein as a matrix synchronization operation. Any suitable parameters can be used in some embodiments.

For example, in some embodiments, the parameters can include an identifier of a matrix that is represented by M, DP, and DM. More particularly, for example, parameters can include a matrix A represented by M, DP, and DM, in some embodiments.

Figure 3:
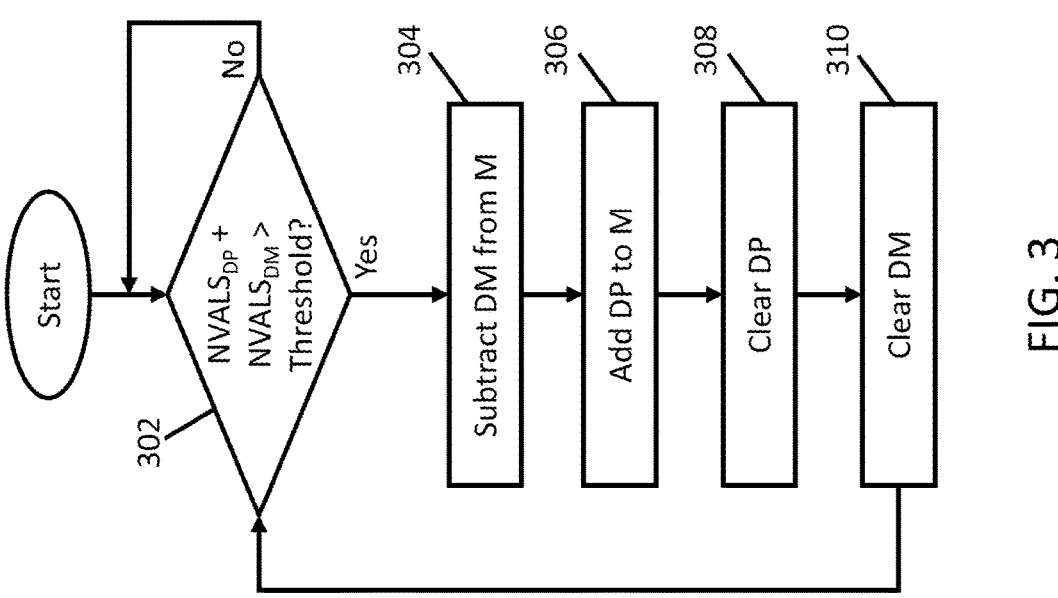
FIG. 3 shows an example of a process for matrix synchronization in accordance with some embodiments of the disclosed subject matter.

FIG. 3 is an example 300 of a process for matrix synchronization in accordance with some embodiments. As illustrated, at 302, the process first determines if the number of values in DP plus the number of values in DM is greater than (or equal to or greater than or equal to) a threshold value. Any suitable threshold value can be used in some embodiments. If the number of values in DP plus the number of values in DM is not greater than (or equal to or greater than or equal to) the threshold value, then process can loop back to 302. Otherwise, if the number of values in DP plus the number of values in DM is greater than (or equal to or greater than or equal to) the threshold value, then process 300 can subtract DM from M using a complement operation and a mask operation (i.e., M=M<~DM>) at 304, add DP to M (i.e., M=M+DP) at 306, clear DP at 308, clear DM at 310, and then loop back to 302. Once 306 and 308 are done, the number of active entries in DP is zero and the number of active entries in DM is zero.

The following tables show examples of runtimes in milliseconds for set and delete operations on matrices of different sizes and having different numbers of entries for matrices represented in sparse representations (e.g., CSR and CSC) and in the delta representation described herein in accordance with embodiment some embodiments.

| Sparse Representation with SET operation | | | |
|---|---|---|---|
| Rows | Columns | Entries | Runtime ms |
| 10,000 | 10,000 | 1,000,000 | 3.16 |
| 100,000 | 100,000 | 10,000,000 | 31.8 |
| 1,000,000 | 1,000,000 | 10,000,000 | 39.4 |
| 10,000,000 | 10,000,000 | 100,000,000 | 425.3 |

| Delta Representation with SET operation | | | |
|---|---|---|---|
| Rows | Columns | Entries | Runtime ms |
| 10,000 | 10,000 | 1,000,000 | 0.0082 |
| 100,000 | 100,000 | 10,000,000 | 0.013 |
| 1,000,000 | 1,000,000 | 10,000,000 | 0.014 |
| 10,000,000 | 10,000,000 | 100,000,000 | 0.015 |

| Sparse Representation with DELETE operation | | | |
|---|---|---|---|
| Rows | Columns | Entries | Runtime ms |
| 10,000 | 10000 | 1,000,000 | 3.6 |
| 100,000 | 100,000 | 10,000,000 | 42.6 |
| 1,000,000 | 1,000,000 | 10,000,000 | 46.1 |
| 10,000,000 | 10,000,000 | 100,000,000 | 466 |

| Delta Representation with DELETE operation | | | |
|---|---|---|---|
| Rows | Columns | Entries | Runtime ms |
| 10,000 | 10,000 | 1,000,000 | 0.01 |
| 100,000 | 100,000 | 10,000,000 | 0.015 |
| 1,000,000 | 1,000,000 | 10,000,000 | 0.015 |
| 10,000,000 | 10,000,000 | 100,000,000 | 0.015 |

As can be seen, the runtime values in the right-most column drastically increase as the size of the matrices increase for "Sparse Representation with SET operation" and "Sparse Representation with DELETE operation" tables. This inconsistency is problematic for real-time graph database systems.

In contrast, the values in the bottom four rows of the right-most column for the "Delta Representation with SET operation" and "Delta Representation with DELETE operation" tables are almost the same. This consistency is beneficial to many graph databases because the processing time is generally independent of the graph size, which makes meeting service level agreements more manageable.

Figure 4:
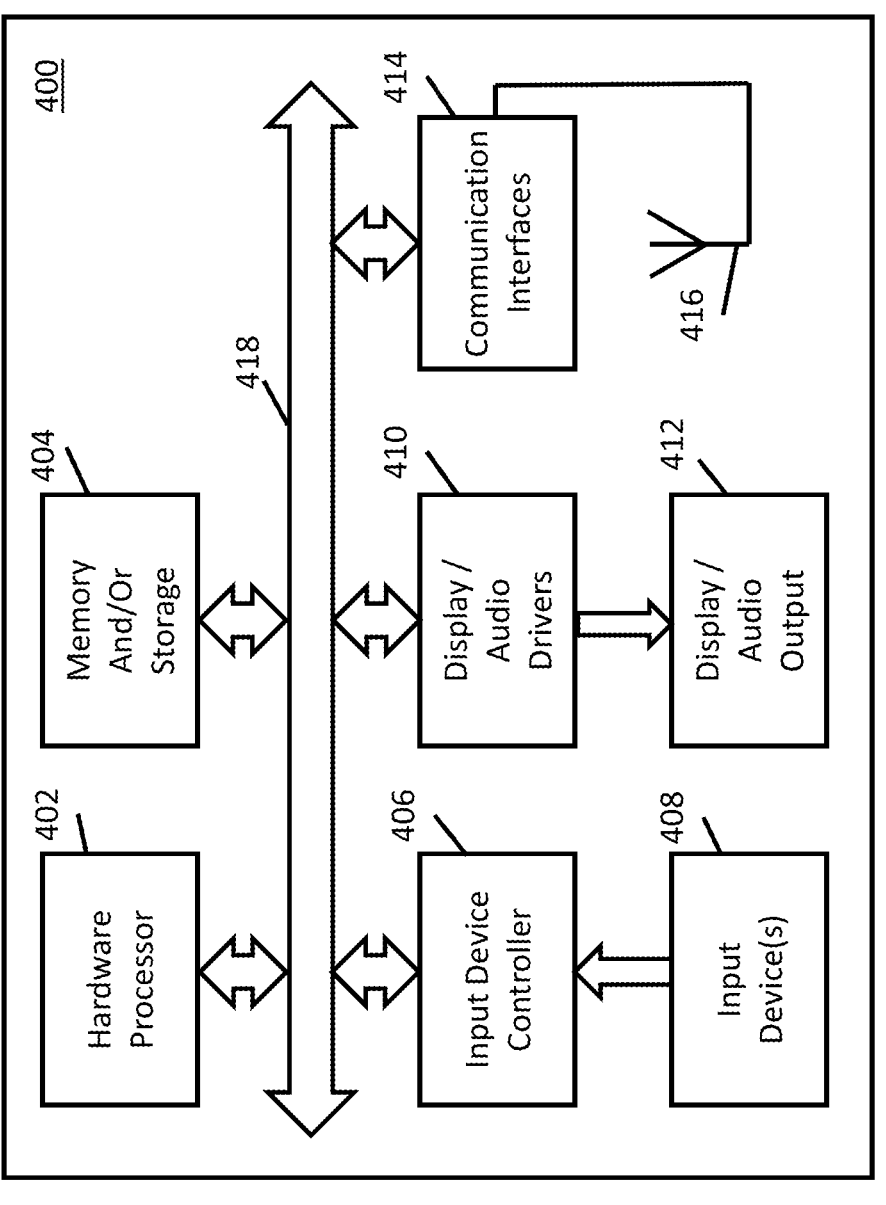
FIG. 4 shows a detailed example of hardware that can be used in accordance with some embodiments of the disclosed subject matter.

In some embodiments, graph databases using the delta representation, and the operations that can be performed on delta representations, as described herein, can be implemented using any suitable computing devices such as servers, desktop computers, laptop computers, mobile devices, tablet computers, appliances, other user devices including computer components, etc. Such computing devices can be implemented using any suitable hardware in some embodiments. For example, in some embodiments, computing devices can be implemented using any suitable general-purpose computer or special purpose computer. For example, a smart phone may be implemented using a special purpose computer. Any such general-purpose computer or special purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general-purpose computer or a special purpose computer in some embodiments. In some embodiments, hardware processor 402 can be controlled by a server program stored in memory and/or storage of a server. For example, in some embodiments, the server program can cause hardware processor 402 to translate a received query related to a graph database to an expression, evaluate the expression, return information corresponding to the query, and/or perform any other suitable functions, operations (such as those described herein), and/or processes. In some embodiments, hardware processor 402 can be controlled by a computer program stored in memory and/or storage 404 of a user device. For example, the computer program can cause hardware processor 402 to transmit a query relating to a graph database to a server storing the graph database, perform operations relating to a graph database as described here, and/or perform any other suitable functions.

Memory and/or storage 404 can be any suitable memory and/or storage for storing programs, data, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks. For example, interface(s) 414 can include network interface card circuitry, wireless communication circuitry, and/or any other suitable type of communication network circuitry.

Antenna 416 can be any suitable one or more antennas for wirelessly communicating with a communication network in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In some embodiments, at least some of the above-described blocks of the processes of FIGS. 1-3 can be executed or performed in any order or sequence not limited to the order and sequence shown in and described in connection with the figure. Also, some of the above blocks of FIGS. 1-3 can be executed or performed substantially simultaneously where appropriate or in parallel to reduce latency and processing times. Additionally or alternatively, some of the above described blocks of the processes of FIGS. 1-4 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for storing updates to a graph database, comprising:

storing the graph database in a random access memory (RAM) component until a user configurable threshold associated with a number of changes is reached before updating the graph database, wherein the graph database is implemented as at least a first matrix having at least 1,000,000 entries;

receiving a first update operation to be performed on the graph database, wherein the first update operation is one of an addition of a node to the graph database, a removal of a node from the graph database, addition of an edge to the graph database, or removal of an edge from the graph database;

representing the first update operation in at least a second matrix, wherein the second matrix only represents one or more changes to be made to the graph database, and wherein the second matrix has a same dimension as the first matrix, and wherein a format of the second matrix is one of Compressed Sparse Row (CSR) hyper-sparse format, a Compressed Sparse Column (CSC) hyper-sparse format, a Boolean CSR hyper-sparse format, and Boolean CSC hyper-sparse format; and performing a synchronization operation in response to determining that the number of changes in the second matrix exceeds the user configurable threshold, wherein accumulated addition and deletions are applied to the first matrix in response to the performing the synchronization operation to update the graph database, wherein the user configurable threshold controls a number of changes in the second matrix prior to initiating the performing the synchronization operation to reduce a number of memory accesses, wherein the performing the synchronization operation performs one of a matrix-matrix addition operation and a matrix-matrix subtraction operation using the at least the first matrix and the at least the second matrix using a hardware processor, and wherein in response to the updating the second matrix is cleared, wherein the first matrix and the second matrix are mathematical matrices, and wherein in absence of the performing the synchronization:

a matrix resize operation is performed to add a node to the graph database, one or more matrix entry deletion is performed to remove a node from the graph database, a single matrix element set operation is performed to add an edge, and a single matrix element delete operation is performed to remove an edge.

2. The method of claim 1, wherein the at least the first matrix is stored in a first compressed sparse format.

3. The method of claim 1, wherein the first update operation is an operation to change an entry in the graph database.

4. The method of claim 1, further comprising:

receiving a second update to the graph database; and representing the second update operation in at least a third matrix, wherein the updating the graph database comprises using a combination of at least the at least the first matrix, the at least the second matrix, and the at least the third matrix.

5. The method of claim 4, wherein:

the at least the second matrix is stored in a second compressed sparse format; and the at least the third matrix is stored in a third compressed sparse format.

6. The method of claim 5, wherein the second compressed sparse format is a hyper-sparse format.

7. The method of claim 6, wherein the third compressed sparse format is a Boolean hyper-sparse format.

8. The method of claim 4, wherein:

the first update operation is one of an operation to add a new entry to the graph database and an operation to make a change to the graph database; and the second update operation is an operation to make a deletion from the graph database.

9. A system for storing updates to a graph database, comprising:

memory; and a hardware processor couple to the memory and configured to:

store the graph database in a random access memory (RAM) component until a user configurable threshold associated with a number of changes is reached before updating the graph database, wherein the graph database is implemented as at least a first matrix having at least 1,000,000 entries;

receive a first update operation to be performed on the graph database, wherein the first update operation is one of an addition of a node to the graph database, a removal of a node from the graph database, addition of an edge to the graph database, or removal of an edge from the graph database;

represent the first update operation in at least a second matrix, wherein the second matrix only represents one or more changes to be made to the graph database, and wherein the second matrix has a same dimension as the first matrix, and wherein a format of the second matrix is one of Compressed Sparse Row (CSR) hyper-sparse format, a Compressed Sparse Column (CSC) hyper-sparse format, a Boolean CSR hyper-sparse format, and Boolean CSC hyper-sparse format; and perform a synchronization operation in response to determining that the number of changes in the second matrix exceeds the user configurable threshold, wherein accumulated addition and deletions are applied to the first matrix in response to the performing the synchronization operation to update the graph database, wherein the user configurable threshold controls a number of changes in the second matrix prior to initiating the performing the synchronization operation to reduce a number of memory accesses, wherein the performing the synchronization operation performs one of a matrix-matrix addition operation and a matrix-matrix subtraction operation using the at least the first matrix and the at least the second matrix, and wherein in response to the updating the second matrix is cleared, wherein the first matrix and the second matrix are mathematical matrices, and wherein in absence of the performing the synchronization:

a matrix resize operation is performed to add a node to the graph database, one or more matrix entry deletion is performed to remove a node from the graph database, a single matrix element set operation is performed to add an edge, and a single matrix element delete operation is performed to remove an edge.

10. The system of claim 9, wherein the at least the first matrix is stored in a first compressed sparse format.

11. The system of claim 9, wherein the first update operation is an operation to change an entry in the graph database.

12. The system of claim 9, wherein the hardware processor is further configured to:

receive a second update to the graph database; and represent the second update operation in at least a third matrix, wherein the updating the graph database comprises using a combination of at least the at least the first matrix, the at least the second matrix, and the at least the third matrix.

13. The system of claim 12, wherein:

the at least the second matrix is stored in a second compressed sparse format; and the at least the third matrix is stored in a third compressed sparse format.

14. The system of claim 13, wherein the second compressed sparse format is a hyper-sparse format.

15. The system of claim 14, wherein the third compressed sparse format is a Boolean hyper-sparse format.

16. The system of claim 12, wherein:

the first update operation is one of an operation to add a new entry to the graph database and an operation to make a change to the graph database; and

the second update operation is an operation to make a deletion from the graph database.

17. A non-transitory computer-readable medium containing computer executable instructions that, when executed by a processor, cause the processor to perform a method for storing updates to a graph database, the method comprising:

storing the graph database in a random access memory (RAM) component until a user configurable threshold associated with a number of changes is reached before updating the graph database, wherein the graph database is implemented as at least a first matrix having at least 1,000,000 entries;

receiving a first update to the graph database, wherein the first update operation is one of an addition of a node to the graph database, a removal of a node from the graph database, addition of an edge to the graph database, or removal of an edge from the graph database;

storing the first update to the graph database in at least a second matrix, wherein the second matrix only represents one or more changes to be made to the graph database, and wherein the second matrix has a same dimension as the first matrix, and wherein a format of the second matrix is one of Compressed Sparse Row (CSR) hyper-sparse format, a Compressed Sparse Column (CSC) hyper-sparse format, a Boolean CSR hyper-sparse format, and Boolean CSC hyper-sparse format; and performing a synchronization operation in response to determining that the number of changes in the second matrix exceeds the user configurable threshold, wherein accumulated addition and deletions are applied to the first matrix in response to the performing the synchronization operation to update the graph database, wherein the user configurable threshold controls a number of changes in the second matrix prior to initiating the performing the synchronization operation to reduce a number of memory accesses, wherein the performing the synchronization operation performs a combination of at least one of a matrix-matrix addition operation and a matrix-matrix subtraction operation on the first matrix and the at least the second matrix, and wherein in response to the updating the second matrix is cleared, wherein the first matrix and the second matrix are mathematical matrices, and wherein in absence of the performing the synchronization:

a matrix resize operation is performed to add a node to the graph database, one or more matrix entry deletion is performed to remove a node from the graph database, a single matrix element set operation is performed to add an edge, and a single matrix element delete operation is performed to remove an edge.

18. The non-transitory computer-readable medium of claim 17, wherein the at least the first matrix is stored in a first compressed sparse format.

19. The non-transitory computer-readable medium of claim 17, wherein the first update operation is an operation to change an entry in the graph database.

20. The non-transitory computer-readable medium of claim 17, wherein the method further comprises:

receiving a second update to the graph database; and representing the second update operation in at least a third matrix, wherein the updating the graph database comprises using a combination of at least the at least the first matrix, the at least the second matrix, and the at least the third matrix.

21. The non-transitory computer-readable medium of claim 20, wherein:

the at least the second matrix is stored in a second compressed sparse format; and the at least the third matrix is stored in a third compressed sparse format.

22. The non-transitory computer-readable medium of claim 21, wherein the second compressed sparse format is a hyper-sparse format.

23. The non-transitory computer-readable medium of claim 22, wherein the third compressed sparse format is a Boolean hyper-sparse format.

24. The non-transitory computer-readable medium of claim 20, wherein:

the first update operation is one of an operation to add a new entry to the graph database and an operation to make a change to the graph database; and the second update operation is an operation to make a deletion from the graph database.

* * * * *